United States Patent
D'Hulster

(10) Patent No.: US 8,590,575 B2
(45) Date of Patent: Nov. 26, 2013

(54) SCRIM-ENFORCED PIPE LINER

(75) Inventor: Gerald Scott D'Hulster, Clearwater, FL (US)

(73) Assignee: Perma-Liner Industries, LLC, Clearwater, FL (US)

( * ) Notice: Subject to any disclaimer, the term of this patent is extended or adjusted under 35 U.S.C. 154(b) by 1012 days.

(21) Appl. No.: 12/642,229

(22) Filed: Dec. 18, 2009

(65) Prior Publication Data

US 2010/0243091 A1   Sep. 30, 2010

Related U.S. Application Data

(60) Provisional application No. 61/164,006, filed on Mar. 27, 2009.

(51) Int. Cl.
    *F16L 9/14* (2006.01)
(52) U.S. Cl.
    USPC ............ 138/98; 138/97; 138/124; 264/269; 156/287; 405/184.2; 405/150.1
(58) Field of Classification Search
    USPC ............ 138/98, 97, 125; 264/516, 36.17; 405/150.1, 184.2; 156/287, 294
    See application file for complete search history.

(56) References Cited

U.S. PATENT DOCUMENTS

| | | | | |
|---|---|---|---|---|
| 4,723,579 A | * | 2/1988 | Hyodo et al. | 138/124 |
| 4,976,290 A | * | 12/1990 | Gelin et al. | 138/141 |
| 5,077,107 A | * | 12/1991 | Kaneda et al. | 428/36.1 |
| 5,501,248 A | * | 3/1996 | Kiest, Jr. | 138/98 |
| 5,836,357 A | * | 11/1998 | Kittson et al. | 138/98 |
| 5,868,169 A | * | 2/1999 | Catallo | 138/98 |
| 5,911,246 A | * | 6/1999 | Kittson et al. | 138/98 |
| 6,042,668 A | * | 3/2000 | Kamiyama et al. | 156/93 |
| 6,360,780 B1 | * | 3/2002 | Adolphs et al. | 138/98 |
| 6,508,276 B2 | * | 1/2003 | Radlinger et al. | 138/125 |
| 6,708,729 B1 | * | 3/2004 | Smith | 138/98 |
| 6,732,763 B2 | | 5/2004 | Williamson et al. | |

\* cited by examiner

*Primary Examiner* — Patrick F Brinson

(74) *Attorney, Agent, or Firm* — McKee, Voorhees & Sease, P.L.C.

(57) ABSTRACT

Stretch-resistant liners for lining pipes, pipes lined with stretch-resistant liners, and methods for lining pipes with stretch-resistant liners. The liners are made from a lamination that includes a sealing layer, a strength layer of stretch-resistant woven material that overlies the sealing layer, a support layer of non-woven resin-impregnated material that overlies the strength layer, and a barrier layer that overlies the support layer. The lamination is rolled into a tube and inverted when inserted into a pipe so that the barrier layer is the layer that abuts the interior wall of the pipe, the support layer underlies the barrier layer, the strength layer underlies the support layer and the sealing layer underlies the strength layer is contacted by materials flowing through the pipe.

8 Claims, 1 Drawing Sheet

SCRIM-ENFORCED PIPE LINER

CROSS-REFERENCE TO RELATED APPLICATIONS

This disclosure is a continuation of and claims priority to provisional application No. 61/164,006, filed Mar. 27, 2009, having the same title and the same inventor. Said provisional application is incorporated herein by reference.

BACKGROUND OF THE INVENTION

1. Field of Invention

This invention relates, generally, to a tubular lining material for lining pipes in need of repair or structural reinforcement.

2. Description of the Prior Art

Conventional pipe repair requires that the pipe be dug up and replaced. However, inventors have developed elongate inflatable bladders that can be inserted into a pipe at an access point and then inflated so that the bladder is inverted upon entering the pipe. More particularly, the mouth or leading end of a bladder is attached to the open end of a pipe. The trailing end of the bladder is then inserted into the pipe, thereby inverting the bladder. The bladder provides a substrate for a curable resin that abuts the interior walls of the pipe when the bladder is inflated. The repair is complete when the resin has cured.

Inversion of the bladder is not needed when lining a pipe that is open at both ends. Insertion by inversion is needed when lining lateral pipes (pipes that form a T-intersection with other pipes or any other pipe that cannot be easily accessed from both ends.

The liners that have been developed are difficult and expensive to manufacture because the liners include a support layer sandwiched between two sealing layers. This arrangement of parts interferes with absorption by the sealing layer of the curable resin (known as "wetting"). The curable resin is absorbed relatively quickly by the sealing layer until the curable resin reaches the support layer that is embedded in the support layer.

There is a need for a liner that is free of the wetting problem.

However, it was not obvious to those of ordinary skill in the art, in view of the prior art considered as a whole at the time the present invention was made, how the wetting problem could be overcome.

SUMMARY OF INVENTION

The longstanding but heretofore unfulfilled need for stretch-resistant liners for pipes, pipes lined with stretch-resistant liners, and methods for lining pipes with stretch-resistant liners is now fulfilled by a new, useful, and nonobvious invention. The novel liners are particularly useful for lining lateral pipes and other pipes that cannot be easily accessed from both ends.

The novel liner is made from a strength sleeve of stretch-resistant woven fabric that abuts a support sleeve formed of a layer of non-woven, felt-like material impregnated with a curable resin. The strength sleeve and the support sleeve are sandwiched between a sealing sleeve and a barrier sleeve. The novel structure also includes pipes lined with the stretch-resistant liners and the novel method includes steps for lining pipes with stretch-resistant liners.

More particularly, in a first embodiment the novel stretch-resistant liner for a pipe is made of a multi-layered tube-shaped lining that includes a barrier sleeve formed of a water-impervious material. The barrier sleeve has a radially innermost surface and a radially outermost surface that abuts the interior cylindrical walls of a pipe when the novel liner is installed. The support sleeve includes a layer of stretch-resistant woven fiberglass material and has a radially outermost surface that abuts the radially innermost surface of the barrier sleeve when the novel liner is installed in a pipe.

The strength sleeve is formed of a stretch-resistant woven material such as a cross-hatched short fiberglass scrim. It has a radially outermost surface that abuts the radially innermost surface of the support sleeve when the novel liner is installed in a pipe.

The sealing sleeve is a film of air impermeable plastic coated onto the radially innermost surface of the strength sleeve.

Accordingly, when the novel pipe liner is operatively installed in the lumen of a pipe, the radially innermost surface of the sealing surface is exposed to water and other material that flow through the pipe, the outermost surface of the sealing sleeve abuts the radially innermost surface of the strength sleeve, the radially outermost surface of the strength sleeve abuts the radially innermost surface of the support sleeve, the radially outermost surface of the support sleeve abuts the radially innermost surface of the barrier sleeve and the radially outermost surface of the barrier sleeve abuts the interior walls of the pipe when the novel liner is installed in a pipe.

Pipes lined with the novel stretch-resistant liners are also within the scope of this invention.

A novel method for lining the interior of a pipe with a stretch-resistant liner includes the steps of providing a flat laminated structure including a sealing layer, a resin-impregnated woven strength layer, a resin-impregnated non-woven support layer, and a barrier layer, cutting the flat laminated structure to a predetermined size, forming the flat laminated structure into a tube shape, securing abutting ends of said flat laminated structure to one another, attaching a leading end of the tube-shaped structure to a pipe opening, and installing the tube-shaped structure into a lumen of the pipe by inverting the tube-shaped structure so that the barrier layer abuts the interior wall of the pipe, the support layer abuts the barrier layer, the strength layer abuts the support layer and the sealing layer abuts the strength layer. The resin in the liner is then cured to form a hardened lining against the interior surface of the pipe.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
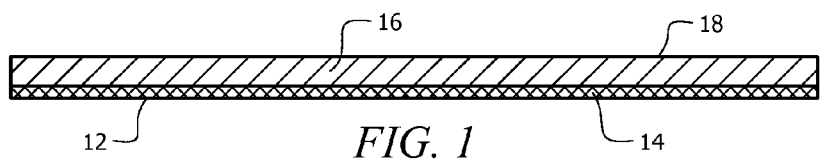
FIG. 1 is a transverse cross-sectional view of the stretch resistant liner before it is formed into a cylindrical shape.

Referring now to FIG. 1, it will there be seen that the novel stretch-resistant liner is depicted in its flat, unrolled configuration and is denoted as a whole by the reference numeral 10.

Lowermost layer 12 is a sealing layer or coating formed of chemically-resistant material such as polyvinylchloride, polyurethane, or polypropylene.

Strength layer 14 overlies sealing layer 12. Said strength layer is made from a stretch-resistant woven material which is preferably a stretch-resistant scrim formed of cross-hatched, short fiberglass fibers. It increases the hoop strength of the layer. It may stretch slightly in a length direction but it will not stretch in a radially outward direction. Layer 14 is impregnated with resin.

Support layer 16 overlies strength layer 14. Said strength layer is a felt base made from non-woven fabrics impregnated with curable resins.

Barrier layer 18 overlies strength layer 16. It is formed of an air-impermeable plastic.

Figure 2:
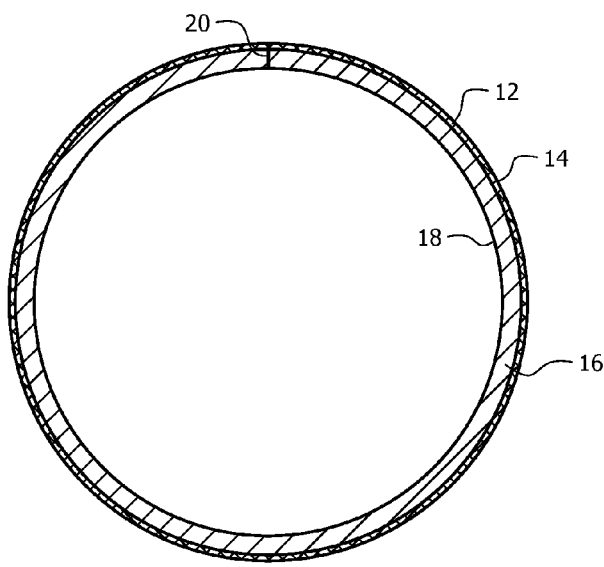
FIG. 2 depicts the structure of FIG. 1 after said structure has been formed into a cylindrical configuration but before it has been inverted and installed into a pipe.

Liner 10 is formed into a cylindrical configuration as depicted in FIG. 2 by bringing its opposite ends together. The parting line of the novel structure when formed into a cylinder or tube shape is denoted 20. The abutting opposite ends are seamed together either by stitching or butt seam welding. The parting line is sealed by a heat applied seam taper that provides a water-tight and air-tight seal.

As depicted in FIG. 2, the radially innermost part of the liner is barrier layer 18. Support layer 16 overlies and is radially outward from said barrier layer 18. Strength layer 14 overlies and is radially outward of support layer 16 and sealing layer 12 overlies and is radially outward of said strength layer 14.

Figure 3:
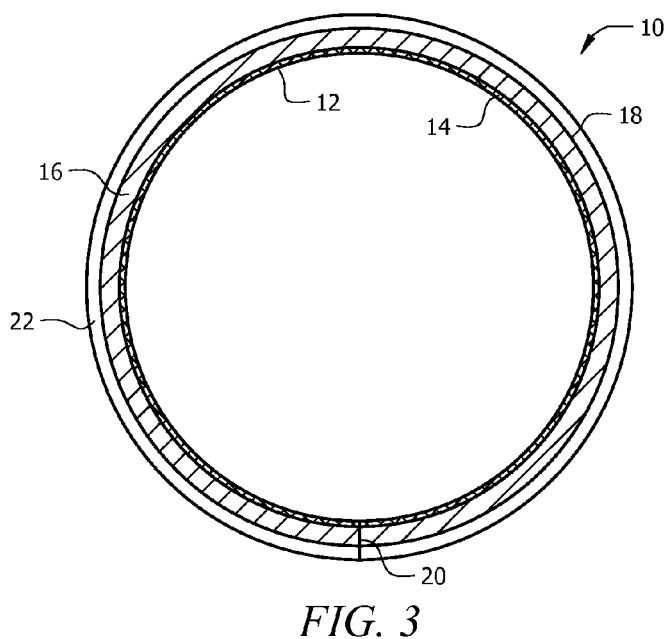
FIG. 3 is a transverse cross-sectional view of the novel stretch-resistant liner when installed in a pipe.

FIG. 3 depicts the novel structure when it has been inverted from its FIG. 2 position and installed into the lumen of a pipe 22 in protecting and rehabilitating relation thereto. The radially innermost layer is now sealing layer 12, followed in a radially outward direction by strength layer 14, support layer 16 and barrier layer 18.

Accordingly, the fluid or solid materials flowing in the lumen of pipe 22 come into contact with sealing layer 12 and said sealing layer 12 protects strength layer 14 from such contact. Barrier layer 18 protects support sleeve 16 from direct contact with the interior wall of pipe 22.

The various fabric layers may be secured together into a laminate structure through conventional means such as stitching or gluing.

There are at least five (5) advantages realized by this multi-layer tubular lining construction.

First, the liner is stretch-resistant because it incorporates stretch-resistant fabric or scrim 14. This takes the guesswork out of sizing liners for coating pipes, prevents blockages that would be caused by extensions of liners past the end of the pipe, and eliminates the need for expensive trimming equipment. Moreover, the stretch-resistant fabric provides a reinforcement or support for non-woven materials 16, thereby adding strength to the liner.

The flexural strength and modulus for the materials exceeds the standards of 4,500 psi and 250,000 psi, respectively, set by the American Society of Testing and Materials (ASTM).

Thirdly, the flexible nature of the multi-layer construction makes the novel liner easier to invert which is useful for liner installation, as discussed in more detail below.

Fourthly, the arrangement of the sealing layer on one side of the support layer prevents the sealing layer from interfering with the support layer's absorption of the curable resin (wetting).

The novel structure provides a more efficient and economical means of manufacturing compared to systems that include a sealing layer sandwiched between two support layers.

Certain terms are used in the disclosure of the invention. In order to facilitate a more clear understanding of the invention, these terms are defined below for the purpose of this disclosure.

As used herein, the term "stretch" means the elongation of a material under an applied load.

The term "stretch-resistant" indicates that the material does not undergo substantial stretch under normal liner installation load conditions. Normal load conditions for a pipe liner include an internal pressure of about two to about twenty pounds per square inch (2-20 psi), but may be as high as about thirty (30) psi.

The term "non-woven material" means a material having a porous sheet structure made from interlocking layers or networks of fibers, filaments, or filamentary structures. The fibers, filaments or filamentary structures may be directionally or randomly oriented and are bonded by friction, cohesion, or adhesion. Felt is one example of a non-woven material.

The term "woven material" means a material made by a weaving process. These materials are typically composed of yarns or threads running lengthwise in the material and filling threads interlaced with each other at approximately right angles.

The term "scrim" means a loosely knitted fabric in which intersecting stitches are spaced relatively widely apart.

The novel strength sleeve may be made of any woven material that is stretch-resistant as well as chemically resistant to the fluids and materials that will typically be flowing through pipes to be lined. The strength sleeve is made of a material that will not release environmentally harmful chemicals into the fluids and materials that pass through the pipes. The woven materials withstand installation pressures and curing temperatures. Stretch-resistant scrims are a particularly suitable material for the strength sleeve. Suitable woven materials and scrims include polyester, polypropylene, and nylon fabrics and scrims. Polyester is a particularly suitable material.

The woven material or scrim is chosen such that it undergoes very little or no stretch during the installation of the liner into a pipe. Tests of elongation under a given load provide a measure of the stretchability of a material. The woven fabrics used in the strength sleeve have low elongations at a given load, compared to the fabrics used in conventional pipe liners. In various embodiments of the present invention, the strength sleeve is made from woven materials, which may be a scrim, having an elongation of less than about five percent (5%) at a load of fifteen (15) psi and less than about twenty percent (20%) at a load of forty five (45) psi. This includes materials having an elongation of less than three percent (3%) at a load of fifteen (15) psi and less than ten percent (10%) at a load of forty five (45) and two and seven-tenths percent (2.7%) psi and further includes materials having an elongation of less than two and seven-tenths percent (2.7%) at a load of fifteen (15) psi and less than ten percent (10%) at a load of forty five (45) psi. Examples of stretch-resistant scrims that are suitable for use in a support sleeve include weft inserted warp knit scrims made from polyester yarn.

The materials that make up the strength layer are sufficiently strong to reinforce the liner into which they are incorporated, yet sufficiently flexible to facilitate inversion of the liner during installation, without substantial cracking of the strength layer. This is particularly important when the pipes to be lined have a small diameter, such as lateral pipes which have may have diameters of four to six inches (4"-6"), or less.

The tensile modulus of a material provides a measurement of the material's flexibility. Woven materials made from polyester, polypropylene, and nylon are suitably flexible for use in the liners of the present invention.

The support layer in the novel liner may be made from any non-woven fabric that is able to absorb a thermoplastic or thermosetting curable resin. As with the strength sleeve, the support sleeve is made from a material that is chemically resistant to the fluids and materials passing through the pipe, that do not release environmentally harmful chemicals into said fluids and materials, and withstand typical installation pressures and curing temperatures.

The non-woven materials may be made by conventional techniques including carding, followed by cross-lapping and needle punching. Fiber materials that may be used to make the non-woven materials include, but are not limited to, polyester fibers, polypropylene fibers, polyethylene fibers, acrylic fibers, aramid fibers, and combinations thereof.

The resins that are absorbed into the strength and support layers of the liner include any resins that can be cured within the non-woven material to form a hardened lining on the interior surface of a pipe. Preferably, the resins are of the type that may be cured at temperatures below about one hundred degrees Centigrade (100° C.) and preferably below about eighty five degrees Centigrade (85° C.). Examples of suitable resins that may be absorbed into the sealing sleeves include polyester, vinyl ester, and epoxy resins, as well as thermosetting polyethylene resin. The resins may also include suitable catalysts to initiate and promote cross-linking reactions.

Barrier layer 18 is coated onto the radially outermost surface of support sleeve 16 and defines the radially outermost surface of the novel liner when it has been installed into a pipe. Barrier layer 18 prevents resin from leaking out of the liner and holds an internal pressure so that the liner may be inflated against the internal surface of the pipe during the installation process. As such, barrier layer 18 should be an air impermeable plastic film. Plastics suitable for the barrier layer include, but are not limited to, polyvinyl chloride, polyethylene, polyurethane, and nylon. The barrier layer may be applied by conventional techniques including direct extrusion, melt coating, and lamination techniques.

Once the layers are secured together they may be formed into a tube-shaped liner using any conventional means. For example, the multi-layered flat laminate may be rolled into a tube having a seam, such as an overlap seam or a butt seam, running along its length. The seam may be welded or stitched together or may be held together with reinforcing tapes.

Example 1

The following represents an illustrative liner made in accordance with the above disclosure.

| | |
|---|---|
| Barrier layer: | clear, natural PVC coating |
| Strength layer: | 500d-9x9 WIWK scrim |
| Support layer | Needle-punch felt |
| Overall Weight (ASTM D3776): | 1005 g/m² (29.6 oz/yd²) |
| Scrim Weight (ASTM D3776): | 50 g/m² (1.5 oz/yd²) |
| Felt Weight (ASTM D3776): | 610 g/m² (18.0 oz/yd²) |
| Barrier Weight (ASTM D3776): | 345 g/m² (10.2 oz/yd²) |
| Trapezoid Tear (ASTM D751): | Warp: 189 lbf |
| | Fill: 180 lbf |
| Grab Tensile (ASTM D751): | Warp: 525 lb/in |
| | Fill: 525 lb/in |
| Adhesion (ASTM D751): | Warp: 20 lb/in |
| | Fill: 19 lb/in |

Example 2

The following represents test results of an illustrative liner made in accordance with the above disclosure. The sample was tested in accordance with ASTM D695, ASTM D638 Type II and ASTM D790 Method I Procedure A. A Support Span-to-Depth Ratio of sixteen to one (16:1) was used as specified in test standard ASTM D790. Thickness measurements, compressive strength, tensile strength, tensile modulus, flexural stress and flexural modulus of elasticity tests were performed on the sample. Five (5) specimens were cut and tested from the sample. The results, summarized below, are averages of said five (5) specimens.

| | |
|---|---:|
| Compressive Strength (psi) ASTM D695: | 4655 |
| Tensile Strength (psi) ASTM D638: | 5841 |
| Tensile Elongation (%) ASTM D638: | 8.0 |
| Flexural Strength (psi) ASTM D790: | 12698.1 |
| Flexural Modulus (psi) ASTM D790: | 442,344 |

The novel method of lining a pipe with a stretch-resistant liner includes the steps of cutting a stretch-resistant liner that includes a resin-impregnated non-woven fabric sleeve having an outer surface and an inner surface to a predetermined length and radius, and disposing at least a portion of the outer surface of the tube-shaped liner into abutting relation to the interior surface of the pipe and curing the resin within the liner to form a hardened, liquid impermeable, jointless lining against the interior surface of the pipe. The liner is cut carefully prior to installation because the liner has little or no stretch in the longitudinal direction. Therefore, the length of the liner is chosen so that it will cover the last joint before the lateral pipe joins a main pipe and the radius is selected such that the external surface of the liner will fit fairly snugly against the internal surface of the pipe when it is installed.

The non-woven fabric sleeve in the liner may be impregnated with resin by conventional methods. For example, the sleeve may be vacuum impregnated with a curable resin and run through a set of rollers to ensure a uniform distribution of the resin within the sleeve. Vacuum impregnation uses a vacuum to force air and moisture out of the non-woven material, allowing the resins to thoroughly penetrate the sleeve. The amount of resin absorbed into the liner is preferably sufficient to fill the open voids, or cells, in the material.

The novel multi-layered tube-shaped liners are particularly suitable for use with this method. In one embodiment of the method for lining a pipe, the liner is inverted into the pipe. It should be understood that the barrier layer, prior to insertion of the liner into the pipe, is the radially innermost layer and said barrier layer becomes the radially outermost layer after the insertion is complete. The sealing layer, prior to insertion of the liner into the pipe, is the radially outermost layer, and becomes the radially innermost layer after the insertion is complete.

More particularly, the liner is placed in a vessel capable of holding internal pressure. The liner extends out of the vessel through a tube and is attached to the outside of that tube. A pressurized gaseous or liquid fluid is applied to the outside of the liner forcing the liner into the pipe, inner surface first, such that the liner is turned inside out, or inverted, on the internal surface of the pipe as it proceeds deeper into the pipe. The radially innermost surface of the barrier sleeve is turned outward and becomes the radially outermost surface of the liner that abuts the internal surface of the pipe. At the same time, the radially outermost surface of the sealing sleeve is turned inward and becomes the radially innermost surface of the liner.

In a preferred method, the lining process is carried out by applying between about two to ten pounds per square inch (2-10 psi) of air to the radially outermost surface of the liner.

However it may be necessary to use pressures up to and exceeding thirty pounds per square inch (30 psi).

Once the interior surface of the pipe is lined in this manner, the resin absorbed into the liner is cured. In a preferred embodiment, the resin in the liner does not require heat for curing. In an alternative embodiment the resins may be heat-curable and may be cured by exposing the interior of the liner to a hot gaseous or liquid fluid such as water, hot air or steam, to produce a hardened liner along the internal surface of the pipe. In a typical embodiment, the resin is cured by heating the air or fluid used to invert the liner within the pipe.

The resins may be cured by exposure to ultraviolet light.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A stretch-resistant liner for a pipe, comprising:
a flat, flexible strength layer of cross-hatched fiberglass fibers;
a flat, flexible support layer of a felt base made from non-woven fabrics impregnated with curable resins disposed in overlying relation to said layer of cross-hatched fiberglass fibers;
said flat, flexible strength layer of cross-hatched fiberglass fibers and said flat, flexible support layer of a felt base being sandwiched between a sealing layer and a barrier layer;
said sealing layer being in contact with said strength layer of cross-hatched fiberglass fibers and said barrier layer being in contact with said support layer;
wherein the liner is configured to be inverted into a pipe such that the barrier layer is adjacent a pipe wall and the sealing layer is the innermost layer in the pipe.

2. The liner of claim 1, further comprising:
said flat, flexible strength layer of cross-hatched fiberglass fibers, said flat, flexible support layer of a felt base, said sealing layer and said barrier layer being formed into a cylindrical configuration so that said barrier layer is in a radially innermost position, said support layer is radially outwardly of said barrier layer, said strength layer is radially outward of said support layer, and said sealing layer is radially outward of said strength layer.

3. The liner of claim 2, further comprising:
said flat, flexible strength layer of cross-hatched fiberglass fibers, said flat, flexible support layer of a felt base, said sealing layer and said barrier layer being formed into said cylindrical configuration and inverted into a pipe lumen so that said barrier layer is in a radially outermost position and is adapted to contact said lumen of said pipe, said support layer is radially inwardly of said barrier layer, said strength layer is radially inward of said support layer, and said sealing layer is radially inward of said strength layer.

4. The liner of claim 1, further comprising:
said support layer being made from non-woven fabrics impregnated with curable resins.

5. The liner of claim 1, further comprising:
said barrier layer formed from a flexible film of air impermeable plastic.

6. The liner of claim 1, further comprising:
said strength layer comprising a flexible stretch-resistant scrim.

7. A pipe lined with a stretch-resistant liner, comprising:
said pipe having a radially innermost surface and a radially outermost surface;
a support sleeve of non-woven fabrics impregnated with curable resins having a radially innermost surface and a radially outermost surface;
a strength sleeve of cross-hatched fiberglass fibers having a radially innermost surface and a radially outermost surface;
a sealing sleeve having a radially innermost surface and a radially outermost surface;
a barrier sleeve having a radially innermost surface and a radially outermost surface;
said radially outermost surface of said sealing sleeve disposed in abutting relation to said radially innermost surface of said strength sleeve;
said radially outermost surface of said strength sleeve disposed in abutting relation to said radially innermost surface of said support sleeve;
said radially outermost surface of said support sleeve disposed in abutting relation to said radially innermost surface of said barrier layer; and
said radially outermost surface of said barrier layer adapted to be disposed in abutting relation to said radially innermost surface of said pipe.

8. A method for lining a pipe with a stretch-resistant liner, comprising the steps of:
providing a flexible support sleeve of non-woven fabrics impregnated with curable resins having a radially innermost surface and a radially outermost surface and disposing said flexible support sleeve in a cylindrical configuration;
providing a flexible strength sleeve of cross-hatched fiberglass fibers having a radially innermost surface and a radially outermost surface;
mounting said flexible strength sleeve in circumscribing relation to said flexible support sleeve in overlying relation to said radially outermost surface of said flexible support sleeve;
applying a barrier layer to said radially innermost surface of said flexible support sleeve;
applying a sealing layer to said radially outermost surface of said flexible strength sleeve; and
introducing said flexible support sleeve and said flexible strength sleeve into a pipe lumen by inverting said flexible support sleeve and said flexible strength sleeve so that said barrier layer is adapted to abut said interior wall of said pipe and so that said sealing layer is adapted to protect said flexible strength sleeve and said flexible support sleeve from materials flowing within said lumen of said pipe.

* * * * *